United States Patent
Kim et al.

(10) Patent No.: US 12,293,041 B2
(45) Date of Patent: May 6, 2025

(54) DISPLAY DEVICE HAVING TOUCH SENSOR AND METHOD OF DRIVING SAME

(71) Applicant: LG Display Co., Ltd., Seoul (KR)

(72) Inventors: Kil Tae Kim, Paju-si (KR); Sung Su Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/362,878

(22) Filed: Jul. 31, 2023

(65) Prior Publication Data

US 2024/0211073 A1    Jun. 27, 2024

(30) Foreign Application Priority Data

Dec. 26, 2022    (KR) .................. 10-2022-0184530

(51) Int. Cl.
| | |
|---|---|
| *G06F 3/041* | (2006.01) |
| *G06F 3/044* | (2006.01) |
| *G09G 3/20* | (2006.01) |
| *G09G 3/36* | (2006.01) |

(52) U.S. Cl.
CPC .......... *G06F 3/0418* (2013.01); *G06F 3/0412* (2013.01); *G06F 3/044* (2013.01); *G09G 3/2096* (2013.01); *G09G 3/36* (2013.01); *G09G 2354/00* (2013.01)

(58) Field of Classification Search
CPC ...... G06F 3/0418; G06F 3/0412; G06F 3/044; G09G 3/2096; G09G 3/36; G09G 2354/00
See application file for complete search history.

(56) References Cited

U.S. PATENT DOCUMENTS

| | | | |
|---|---|---|---|
| 2013/0342478 A1* | 12/2013 | Bae | G06F 3/0443 345/173 |
| 2014/0176459 A1* | 6/2014 | Pyo | G06F 3/041661 345/173 |
| 2015/0103038 A1* | 4/2015 | Han | G06F 3/0443 345/98 |
| 2016/0019827 A1* | 1/2016 | Lee | G06F 3/04184 345/204 |
| 2017/0017340 A1* | 1/2017 | Liu | G09G 3/3696 |
| 2018/0004353 A1* | 1/2018 | Shin | G02F 1/1343 |
| 2018/0024677 A1* | 1/2018 | Kim | G06F 3/0412 345/173 |
| 2023/0048321 A1* | 2/2023 | Kim | G09G 3/3655 |

\* cited by examiner

*Primary Examiner* — Hong Zhou
(74) *Attorney, Agent, or Firm* — Seed IP Law Group LLP

(57) ABSTRACT

The present disclosure provides a display device having a touch sensor, which includes a display panel including a touch sensor configured to display an image and sense presence or absence of a touch, a driver configured to time-division drive the display panel and the touch sensor, and a controller configured to control the driver, wherein the driver outputs a set voltage during a transition period between a display period in which an image is displayed on the display panel and a touch sensing period in which the touch sensor is sensed.

9 Claims, 15 Drawing Sheets

DISPLAY DEVICE HAVING TOUCH SENSOR AND METHOD OF DRIVING SAME

CROSS-REFERENCE TO RELATED APPLICATION(S)

This application claims the benefit of Korean Patent Application No. 10-2022-0184530, filed on Dec. 26, 2022, which is hereby incorporated by reference as if fully set forth herein.

BACKGROUND

Technical Field

The present disclosure relates to a display device having a touch sensor and a method of driving the same.

Description of the Related Art

As information technology develops, the market for display devices, which are communication media between users and information, is growing. Accordingly, display devices such as a light emitting display (LED) device, a quantum dot display (QDD) device, and a liquid crystal display (LCD) device are increasingly used.

The display devices described above include a display panel including sub-pixels, a driver outputting driving signals for driving the display panel, and a power supply for generating power to be supplied to the display panel or the driver.

In such display devices, when driving signals, for example, a scan signal and a data signal, are supplied to sub-pixels formed in a display panel, selected sub-pixels transmit light or directly emit, thereby displaying an image. In addition, the aforementioned display devices may receive user input in the form of a touch based on a touch sensor and execute an instruction corresponding to the touch input.

BRIEF SUMMARY

The present disclosure is directed to a display device having a touch sensor and a method of controlling the same, which, among others, substantially obviate one or more problems due to limitations and disadvantages of the related art.

The present disclosure minimizes a touch insensitivity phenomenon (normal sensing failure) and a problem of increasing inaccuracy of a touch sensor (touch error, touch malfunction, etc.). In addition, the present disclosure minimizes a problem that data lines of a display panel are charged with undesirable voltages or become unstable as external light (sunlight, illumination, etc.) or internal light (e.g., when a backlight unit is included in the display panel) acts as a noise source.

Additional technical benefits, properties, and features of the disclosure will be set forth in part in the description which follows and in part will become apparent to those having ordinary skill in the art upon examination of the following or may be learned from practice of the disclosure. The technical improvements and other benefits of the disclosure may be realized and attained by the structures and other technical features pointed out in the written description and claims hereof as well as the appended drawings.

A display device having a touch sensor includes a display panel including a touch sensor configured to display an image and sense presence or absence of a touch, a driver configured to time-division drive the display panel and the touch sensor, and a controller configured to control the driver, wherein the driver outputs a set voltage during a transition period between a display period in which an image is displayed on the display panel and a touch sensing period in which the touch sensor is sensed.

In some implementations, the set voltage includes a black data voltage or a white data voltage.

In some implementations, the set voltage includes a last data voltage output from the driver before transition from the display period to the transition period.

In some implementations, the set voltage is applied through data lines of the display panel.

In some implementations, the driver includes a first output circuit configured to output a data voltage, a second output circuit configured to output the set voltage, a third output circuit configured to output a load free signal, and a selector configured to selectively connect one of the first output circuit, the second output circuit, and the third output circuit to the data lines of the display panel.

In some implementations, the display panel includes a sub-pixel having a thin film transistor and a liquid crystal, and during the transition period, a DC gate low voltage may be applied to a gate line of the sub-pixel, the set voltage may be applied to a data line of the sub-pixel, and a common voltage line of the sub-pixel may be electrically floating.

In some implementations, the load free signal is applied to the gate line and the common voltage line of the sub-pixel, and the data line may be electrically floating during the touch sensing period.

In an aspect of the present disclosure, a method of driving a display device having a touch sensor includes displaying an image on a display panel during a display period, sensing the touch sensor during a touch sensing period, and outputting a set voltage during a transition period between the display period and the touch sensing period.

In some implementations, the set voltage includes a black data voltage, a white data voltage, or a last data voltage output to the display panel before transition from the display period to the transition period.

In some implementations, the set voltage is applied through data lines of the display panel.

It is to be understood that both the foregoing general description and the following detailed description of the present disclosure are examples and explanatory and are intended to provide further explanation of the disclosure.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to example embodiments of the present disclosure, examples of which are illustrated in the accompanying drawings. Wherever possible, the same reference numbers will be used throughout the drawings to refer to the same or like parts.

A display device having a touch sensor according to the present embodiment may receive user input in the form of a touch based on the touch sensor and execute an instruction corresponding to the touch input. The display device having a touch sensor may be implemented as a television system, an image player, a personal computer (PC), a home theater, an automobile electric device, a smartphone, or the like, but is not limited thereto.

The display device having a touch sensor according to the present embodiment may be implemented as a light emitting display (LED) device, a quantum dot display (QDD) device, a liquid crystal display (LCD) device, or the like. However, this is merely an example, and the present embodiment is not limited thereto and can be applied to various display devices.

Figure 1:
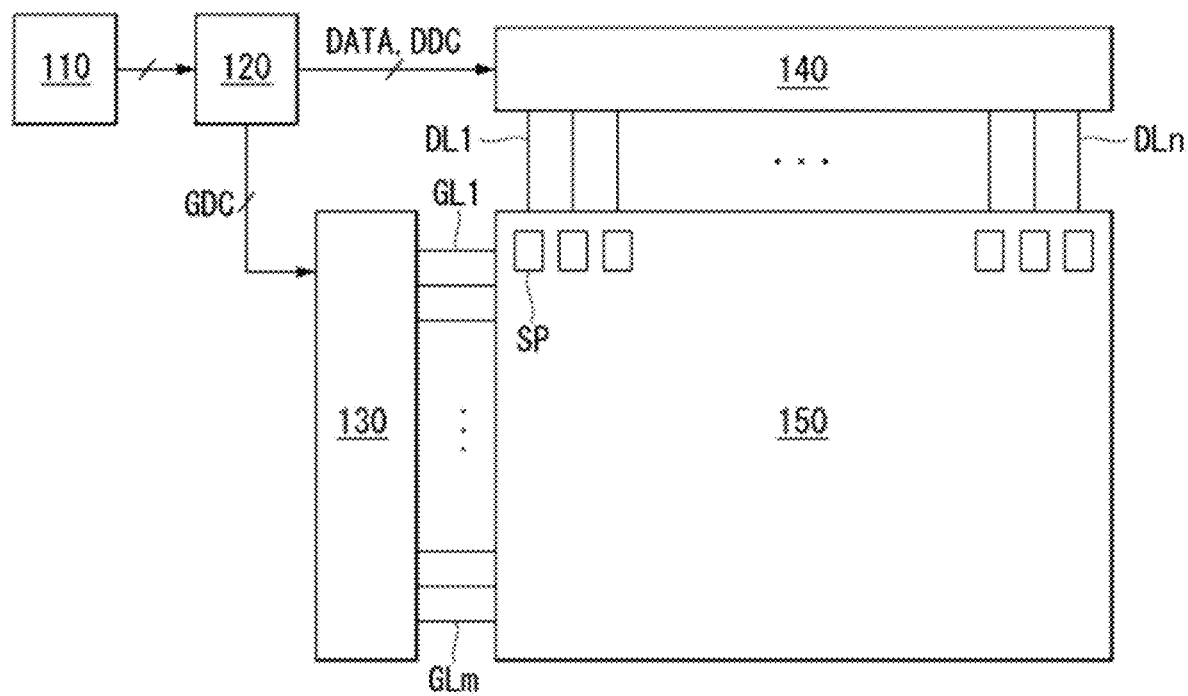
FIG. 1 is a schematic block diagram of a display device.
Figure 2:
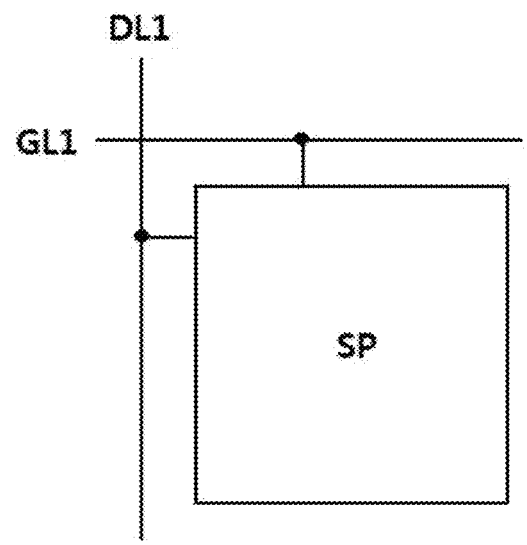
FIG. 2 is a schematic configuration diagram of a sub-pixel shown in FIG. 1.

FIG. 1 is a schematic block diagram of a display device, and FIG. 2 is a schematic configuration diagram of a sub-pixel shown in FIG. 1.

As shown in FIGS. 1 and 2, the display device may include an image provider 110, a timing controller 120, a scan driver 130, a data driver 140, and a display panel 150.

The image provider 110 (or a host system) may output various driving signals along with an externally supplied image data signal or an image data signal stored in an internal memory. The image provider 110 may supply data signals and various driving signals to the timing controller 120.

The timing controller 120 may output a gate timing control signal GDC for controlling operation timing of the scan driver 130, a data timing control signal DDC for controlling operation timing of the data driver 140, and various synchronization signals (a vertical synchronization signal Vsync and a horizontal synchronization signal Hsync), and the like. The timing controller 120 may supply a data signal DATA supplied from the image provider 110 to the data driver 140 along with the data timing control signal DDC. The timing controller 120 may be implemented in the form of an integrated circuit (IC) and mounted on a printed circuit board, but is not limited thereto.

The scan driver 130 may output a gate signal (or a scan signal) in response to the gate timing control signal GDC supplied from the timing controller 120. The scan driver 130 may supply gate signals (or scan signals) to sub-pixels included in the display panel 150 through gate lines GL1 to GLm. The scan driver 130 may be implemented in the form of an IC or directly formed on the display panel 150 in a gate-in-panel structure, but is not limited thereto.

The data driver 140 may sample and latch the data signal DATA in response to the data timing control signal DDC supplied from the timing controller 120, convert the digital data signal into an analog data voltage on the basis of a gamma reference voltage, and output the analog data voltage. The data driver 140 may supply the data voltage to the sub-pixels included in the display panel 150 through data lines DL1 to DLn. The data driver 140 may be implemented in the form of an IC and mounted on the display panel 150 or mounted on a printed circuit board, but is not limited thereto.

The display panel 150 may display an image in response to driving signals including gate signals (or scan signals) and a data voltage. The sub-pixels of the display panel 150 may directly emit light or project light based on a backlight unit. The display panel 150 may be manufactured based on a rigid or flexible substrate such as glass, silicon, or polyimide. Further, the sub-pixels may include red, green, and blue pixels or red, green, blue, and white pixels.

For example, one sub-pixel SP may include a pixel circuit connected to the first data line DL1 and the first gate line GL1. The pixel circuit may include a switching transistor, a capacitor, and a liquid crystal layer. Further, the pixel circuit may include a switching transistor, a capacitor, a driving transistor, an organic light emitting diode, and the like.

In the above description, the timing controller 120, the scan driver 130, and the data driver 140 have been described as individual components. However, one or more of the timing controller 120, the scan driver 130, and the data driver 140 may be integrated into one IC according to a display device implementation method.

FIGS. 3 to 8 are block diagrams schematically illustrating a display device having a touch sensor.

Figure 3:
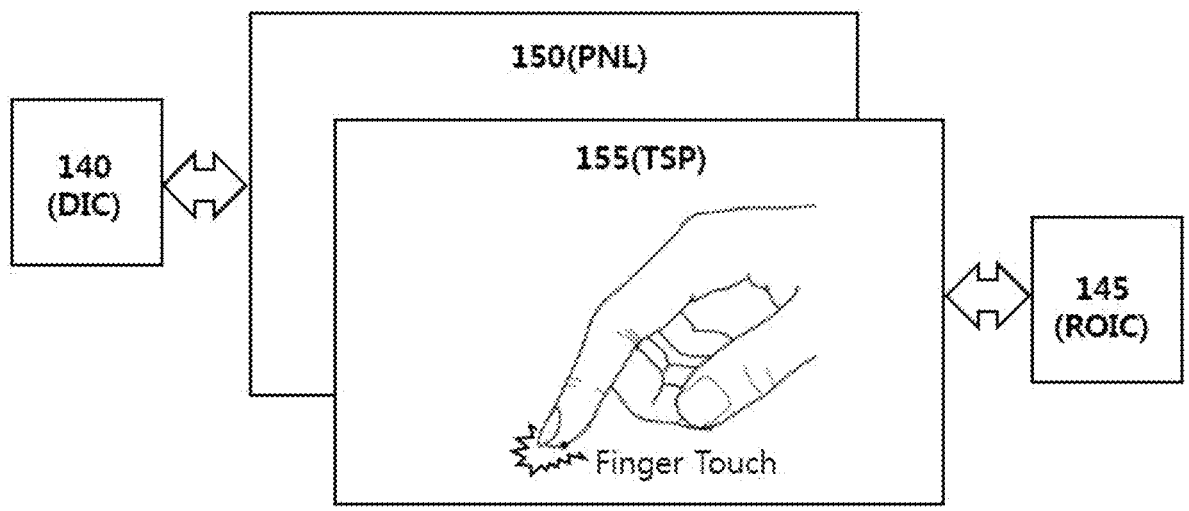
FIGS. 3 to 8 are block diagrams schematically illustrating a display device having a touch sensor.
Figure 4:
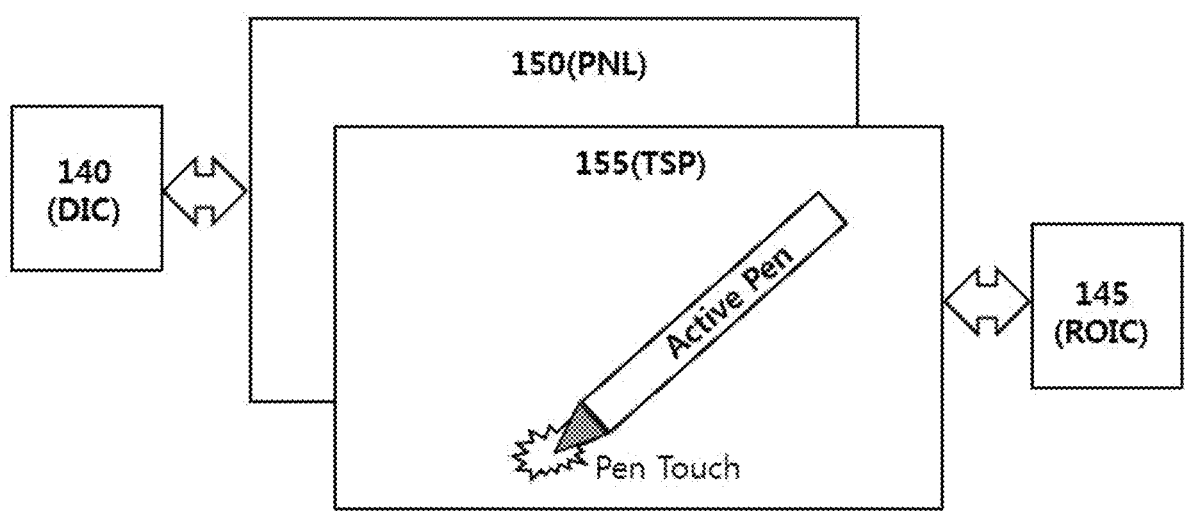

As shown in FIGS. 3 and 4, the display panel 150 (PNL) included in the display device and displaying an image may have a touch sensor 155 (TSP) capable of receiving user input in a touch manner. The touch sensor 155 may have touch electrodes for detecting presence or absence of a touch on the display panel 150 and input position information. The touch sensor 155 may detect a finger touch by a user's finger, a pen touch by a pen gripped by a user, and the like.

The display panel 150 may be driven by the data driver 140 (DIC), and the touch sensor 155 may be driven by the touch driver 145 (ROIC). The display panel 150 and the touch sensor 155 may be integrated into one panel.

Figure 5:
Figure 6:
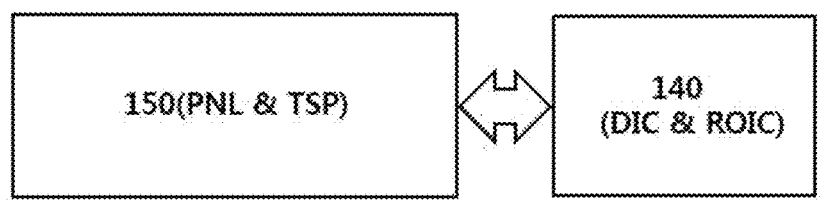

When the display panel 150 and the touch sensor 155 are integrated into one panel (PNL & TSP), the data driver 140 and the touch driver 145 may be independently provided as shown in FIG. 5 or the touch driver ROIC may be included in the data driver 140 as shown in FIG. 6.

Figure 7:
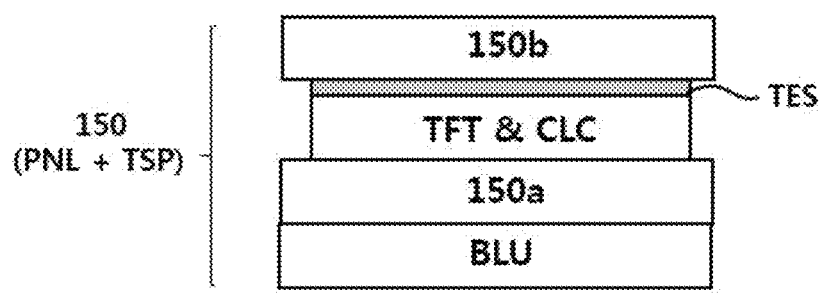

As shown in FIG. 7, the display panel 150 may include a transistor array (TFT) and a liquid crystal layer (CLC) disposed between a lower substrate 150a and an upper substrate 150b. The display panel 150 may include a backlight unit (BLU) providing light. The touch sensor 155 may be implemented as an electrode layer TES included in the display panel 150.

Figure 8:
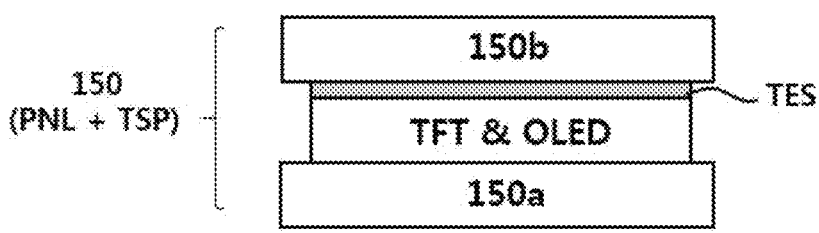

As shown in FIG. 8, the display panel 150 may include a transistor array (TFT) and light emitting diodes (OLEDs) positioned between the lower substrate 150a and the upper substrate 150b. The touch sensor 155 may be implemented as an electrode layer TES included inside the display panel 150.

In FIGS. 7 and 8, an example in which the touch sensor 155 is included in the display panel 150 has been illustrated and described. However, the touch sensor 155 may be implemented as an add-on type in which it is separately attached to the upper substrate 150b, an in-cell type in which it is formed through a series of processes involved in manufacturing the display panel 150, or an on-cell type.

Figure 9:
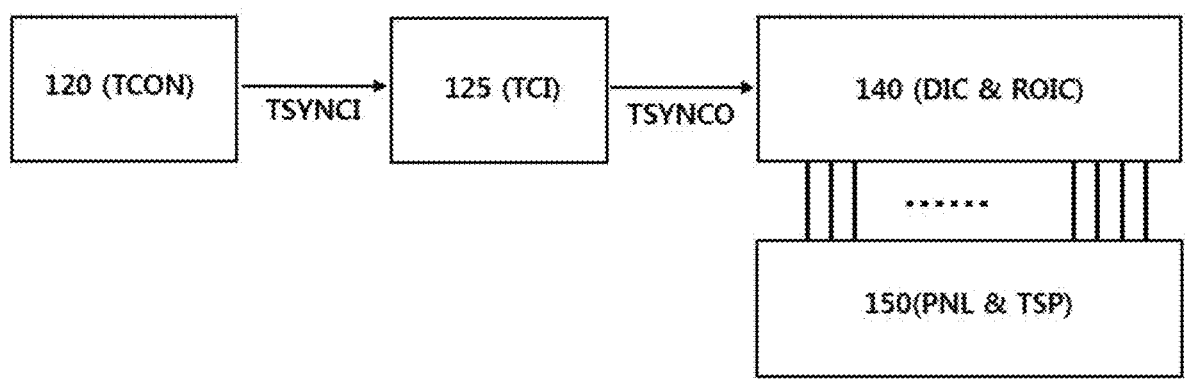
FIG. 9 is a block diagram showing some components of a display device having a touch sensor according to a first embodiment.

FIG. 9 is a block diagram showing some components of a display device having a touch sensor according to a first embodiment, and FIGS. 10 to 13 are waveform diagrams for describing touch synchronization signals for driving the display device having a touch sensor.

As shown in FIG. 9, a touch sensor TSP may be integrated with a display panel 150 (PNL & TSP), and a touch driver ROIC may be integrated with a data driver 140 (DIC & ROIC). The data driver 140 may be controlled by a touch controller 125 (TCI), and the touch controller 125 may be controlled by a timing controller 120 (TCON).

The timing controller 120 may generate a first touch synchronization signal TSYNCI for controlling the touch controller 125. The first touch synchronization signal TSYNCI may be input to the touch controller 125. The touch controller 125 may generate a second touch synchronization signal TSYNCO for controlling the touch driver ROIC included in the data driver 140 on the basis of the first touch synchronization signal TSYNCI input from the timing controller 120.

Figure 10:
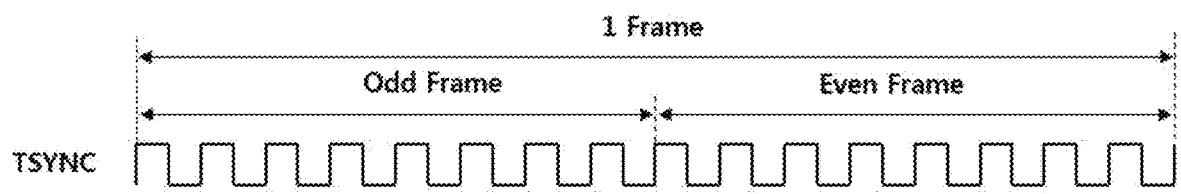
FIGS. 10 to 13 are waveform diagrams for describing touch synchronization signals for driving the display device having a touch sensor.

As shown in FIG. 10, a touch synchronization signal TSYNC may be divided into an odd frame corresponding to a first portion, e.g., ½, of 1 frame and an even frame corresponding to the remaining portion, e.g., ½, of the 1 frame. The odd frame and the even frame of the touch synchronization signal TSYNC may be generated in the form of pulses alternating between high and low levels for a time of, e.g., 8.4 ms.

Figure 11:
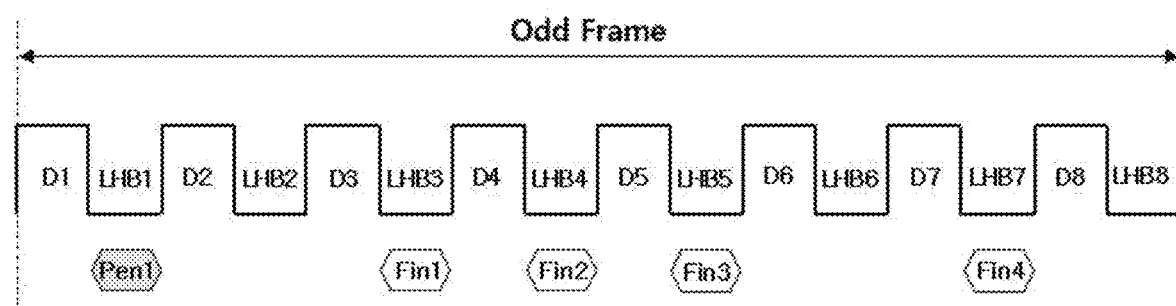
Figure 12:
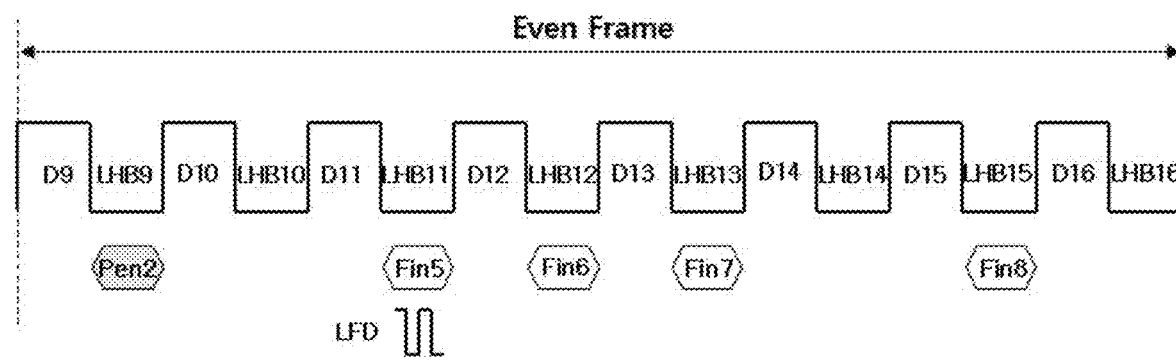

As shown in FIGS. 11 and 12, the odd frame and the even frame of the touch synchronization signal TSYNC may include high periods D1 to D16 in which output of data voltages is allowed and low periods LHB1 to LHB16 in which sensing of touch electrodes is allowed. In addition, high periods and low periods in the first portion of the frame, e.g., ½ of the high periods D1 to D16 and the low periods LHB1 to LHB16, may be assigned to the odd frame, and high periods and low periods in the second portion of the frame, e.g., the remaining ½ of the high periods D1 to D16 and the low periods LHB1 to LHB16, may be assigned to the even frame. The low periods LHB1 to LHB16 in which sensing of the touch electrodes is allowed are also referred to as LHB (Long Horizontal Blank).

Among the low periods LHB1 to LHB16 in which sensing of the touch electrodes is allowed, the first low period LHB1 and the ninth low period LHB9 may be referred to as pen touch periods Pen1 and Pen2 for detecting a pen touch, and the third, fourth, fifth, and seventh low periods LHB3, LHB4, LHB5, and LHB7, and the eleventh, twelfth, thirteenth, and fifteenth low periods LHB11, LHB12, LHB13, and LHB15 may be referred to as finger touch periods Fin1 to Fin8 for detecting a finger touch.

Meanwhile, a load free signal LFD having the same phase and the same amplitude as the touch driving signal applied to the touch sensor can be input in one of the finger touch periods Fin1 to Fin8, as can be seen at the bottom of "Fin5." The load free signal LFD may be input to at least one of a touch sensor, a gate line, and a data line where touch sensing is not performed in the display panel. The load free signal LFD may be a signal for reducing parasitic capacitance caused by a touch sensor without touch sensing and other electrodes (gate lines and data lines) adjacent to the touch sensor.

As shown in FIGS. 9 to 13, from the point of view of the touch controller 125, the touch synchronization signal TWYNC described above may be divided into the first touch synchronization signal TSYNCI corresponding to an input synchronization signal input from the timing controller 120 and a second touch synchronization signal TSYNCO corresponding to an output synchronization signal output from the touch controller 125.

The first touch synchronization signal TSYNCI may include active periods Active and blank periods Blank. The active period Active may be referred to as a display period Dp for displaying an image, and the blank period Blank may be referred to as a period for not displaying an image. The display period Dp does not completely coincide with the active period Active and may occur with front and rear margin periods Dm1 and Dm2. Further, the front and rear margin periods Dm1 and Dm2 may be different. The front and rear margin periods Dm1 and Dm2 may be referred to as periods provided to minimize mutual electrical interference when a driving mode is changed from a touch sensing period Ts to the display period Dp.

The second touch synchronization signal TSYNCO may include touch disable periods Td and touch enable periods Te. The touch disable period Td may be defined as a period in which touch sensing is not performed, and the touch enable period Te may be defined as the touch sensing period Ts in which touch sensing is performed. The touch sensing period Ts does not completely coincide with the touch enable period Te, and may occur with front and rear margin periods Tm1 and Tm2. Further, the front and rear margin periods Tm1 and Tm2 may be different. The front and rear margin periods Tm1 and Tm2 may be referred to as periods provided to minimize mutual electrical interference when the driving mode is changed from the display period Dp to the touch sensing period Ts. Hereinafter, an example in which the front margin period Tm1 of the touch sensing period Ts is longer than the rear margin period Tm2 will be described, but it should be noted that the margin periods may vary depending on driving environment conditions for the device.

As described above, the timing controller 125 may generate the second touch synchronization signal TSYNCO in an asynchronous form from the first touch synchronization signal TYNCI in consideration of a driving margin according to the driving environment condition of the device. The touch controller 125 can time-division control the output of the data driver 140 on the basis of the second touch synchronization signal TSYNCO. The data driver 140 may distinguish the display period Dp and the touch sensing period Ts on the basis of the second touch synchronization signal TSYNCO, output a data voltage or sense the touch sensor in response thereto, and time-division drive the display panel 150.

Therefore, in the second touch synchronization signal TSYNCO, the touch disable period Td may be referred to as a data input period DIN in which a data voltage is input to the display panel, and the touch sensing period Ts may be referred to as a touch sensing period TSE in which the touch sensor is actually sensed. Further, the front margin period Tm1 between the data input period DIN and the touch sensing period TSE may be referred to as a noise avoidance period NAV between the data input period DIN and the touch sensing period TSE.

Hereinafter, changes in the output of the data driver 140 when one cycle of the second touch synchronization signal TSYNCO is referred to as the data input period DIN, the noise avoidance period NAV, and the touch sensing period TSE as described above will be described.

It should be noted that although two signals first touch synchronization signal TSYNCI and second touch synchronization signal TSYNCO are generated by two elements 120, 125 in some example implementations, similar touch sensing and display control can be achieved using one synchronization signal depending on the circuitry implementation. For example, the data input period DIN in the TSYNCO signal may include front and rear margin periods Dm1 and Dm2 and/or the blank period of the TSYNCI signal may include front and rear margin periods Tm1 and Tm2. Further, in some implementations, the first touch synchronization signal TSYNCI includes only one of the front and rear margin periods Dm1 or Dm2. The second touch synchronization signal TSYNCO signal includes only one of the front and rear margin periods Tm1 or Tm2.

Figure 14:
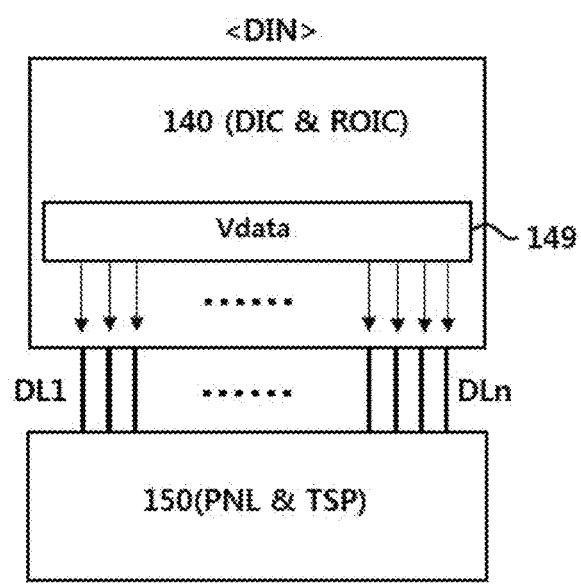
FIGS. 14 to 16 are diagrams for describing changes in output of a data driver according to the first embodiment.
Figure 15:
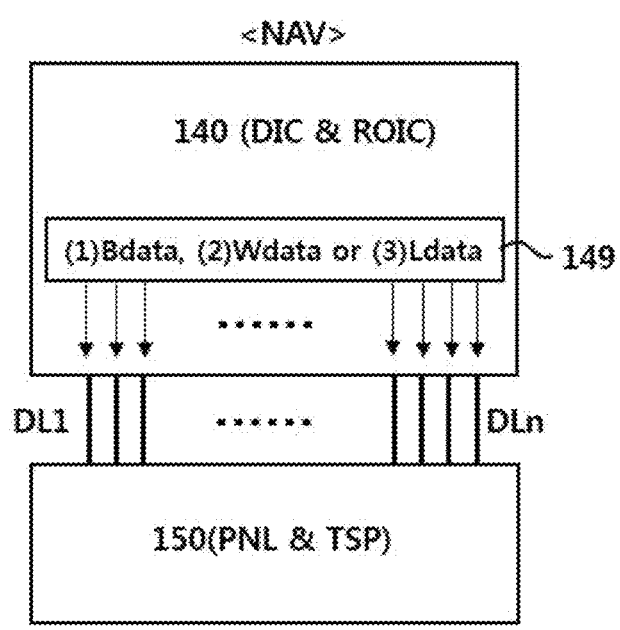
Figure 16:
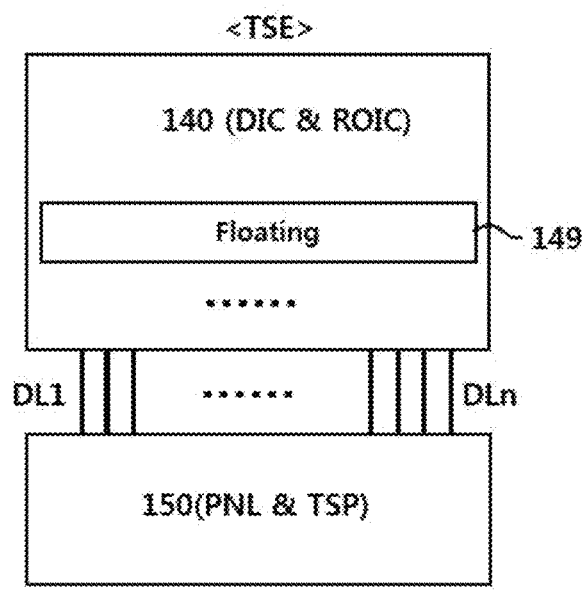

FIGS. 14 to 16 are diagrams for describing changes in the output of the data driver according to the first embodiment.

Figure 13:
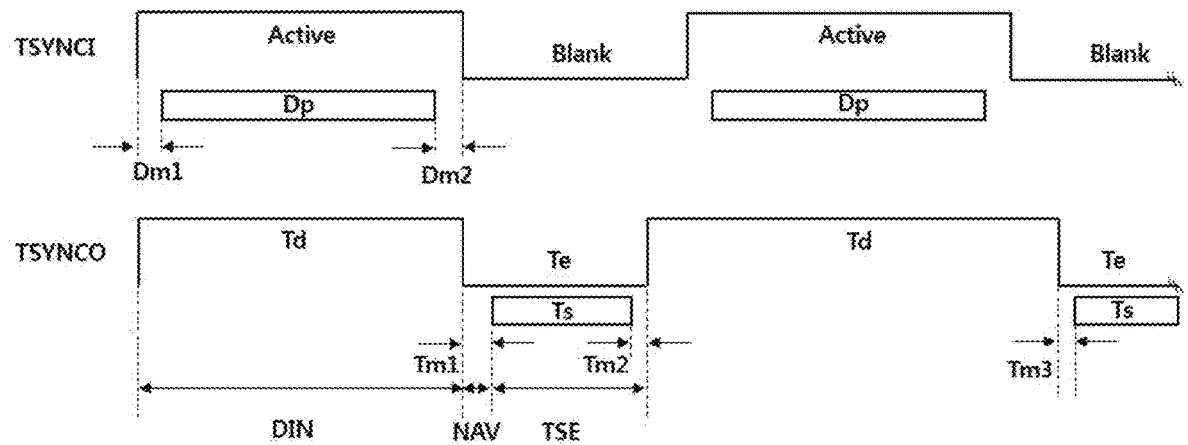

As shown in FIGS. 13 and 14, during the data input period DIN, the data driver 140 may control an output circuit 149 such that data voltages Vdata for displaying an image are output to the data lines DL1 to DLn of the display panel 150. As the data voltages Vdata output from the output circuit 149 are input to the data lines DL1 to DLn, the display panel 150 may operate to display an image based on the data voltages Vdata.

As shown in FIGS. 13 and 15, during the noise avoidance period NAV, the data driver 140 may control the output circuit 149 such that a black data voltage Bdata, a white data voltage Wdata, or the last data voltage Ldata output during the data input period DIN is output to the data lines DL1 to DLn of the display panel 150. As the black data voltage Bdata, the white data voltage Wdata, or the last data voltage Ldata output from the output circuit 149 is input to the data lines DL1 to DLn, the display panel 150 may be maintained in a charged state on the basis of a voltage (Bdata, Wdata or Ldata) set in a specific form. Here, the black data voltage Bdata may be a voltage capable of displaying black on the display panel 150, and the white data voltage Wdata may be a voltage capable of displaying while on the display panel 150. In addition, the last data voltage Ldata may be a voltage capable of maintaining a previous image.

As shown in FIGS. 13 and 15, during the touch sensing period TSE, the data driver 140 may control the output circuit 149 to electrically float such that no voltage is output to the data lines DL1 to DLn of the display panel 150. while the output circuit 149 is in a floating state, the touch driving signal is input to the touch sensor, and thus the display panel 150 can sense the touch sensor.

FIGS. 17 to 20 are diagrams showing a configuration and operation of the output circuit according to the first embodiment in more detail.

Figure 17:
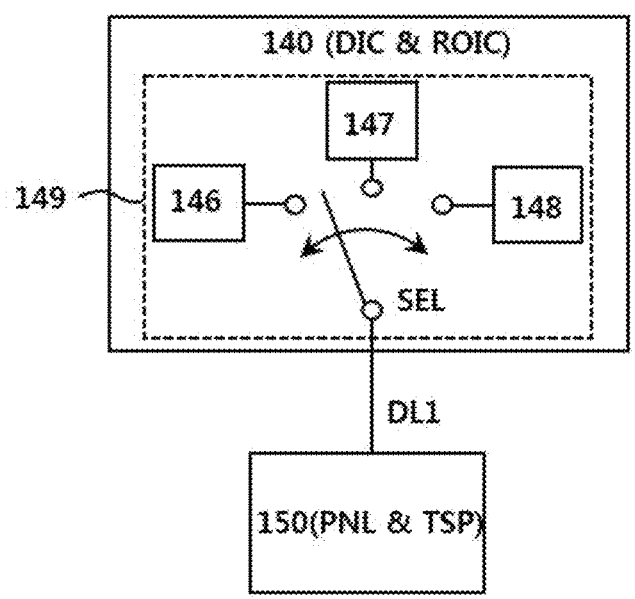
FIGS. 17 to 20 are diagrams showing a configuration and operation of an output circuit according to the first embodiment in more detail.

As shown in FIG. 17, the output circuit 149 may include a first output circuit 146, a second output circuit 148, a third output circuit 147, and a selector SEL. The first output circuit 146 may be a circuit that outputs the black data voltage Bdata, the white data voltage Wdata, or the last data voltage Ldata. The second output circuit 148 may be a circuit that outputs the data voltage Vdata. The third output circuit 147 may be a circuit that outputs the load free signal.

The selector SEL may be a circuit that selects one of the first output circuit 146, the second output circuit 148, and the third output circuit 147 and connects the same to the first data line DL1. The selector SEL may operate in response to a selection signal generated corresponding to the data input period DIN, the noise avoidance period NAV, and the touch sensing period TSE shown in FIG. 13.

Figure 18:
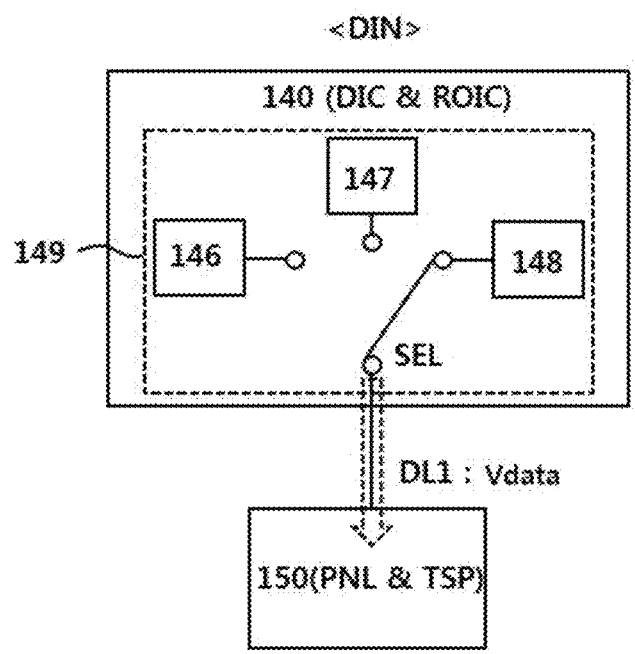

As shown in FIG. 18, the selector SEL may select the second output circuit 148 during the data input period DIN such that the data voltage Vdata is input through the first data line DL1.

Figure 19:
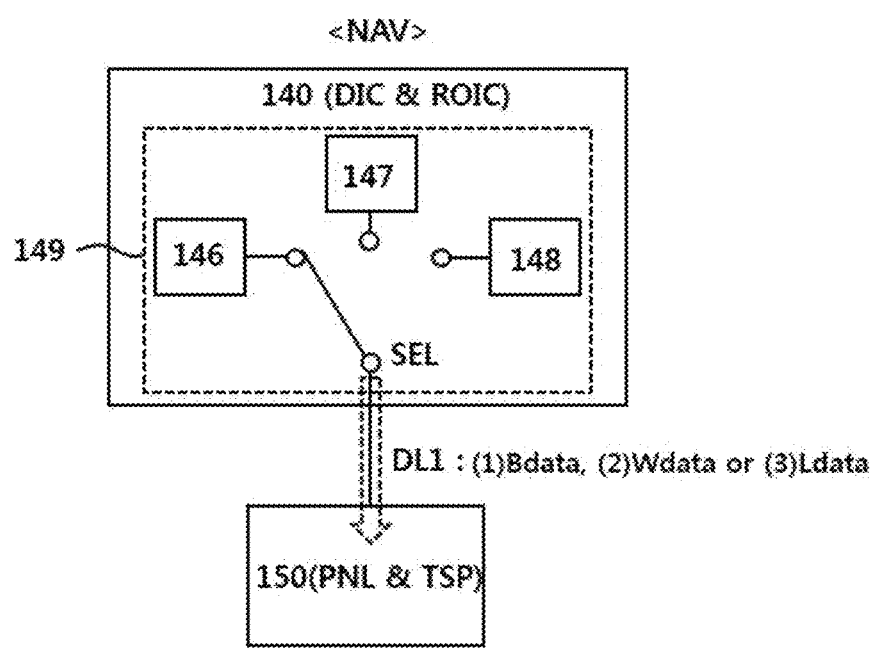

As shown in FIG. 19, the selector SEL may select the first output circuit 146 during the noise avoidance period NAV such that the black data voltage Bdata, the white data voltage Wdata, or the last data voltage Ldata is input through the first data line DL1.

Figure 20:
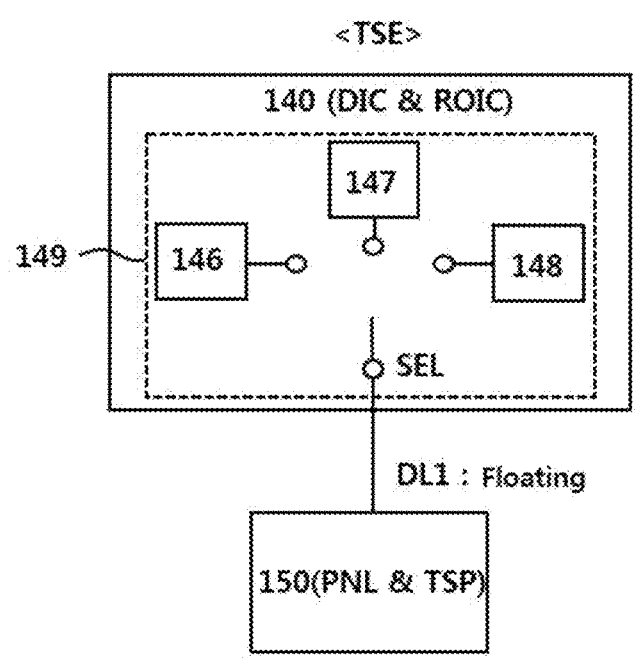

As shown in FIG. 20, the selector SEL may not select any output circuit such that the first data line DL1 is maintained in an electrically floating state during the touch sensing period TSE. That is, during the touch sensing period TSE, no voltage may be applied such that the voltage input in the noise avoidance period NAV is maintained or discharged.

When the noise avoidance period NAV is provided in the period of transition from the data input period DIN to the touch sensing period TSE, and the display panel 150 is charged with a voltage (Bdata, Wdata, or Ldata) set in a specific form as in the first embodiment, the following advantages are obtained.

First, it is possible to minimize a problem that the data lines DL1 to DLn of the display panel 150 are charged with undesirable voltages or become unstable as external light (sunlight, lighting, etc.) or internal light (e.g., in case where the display panel includes the backlight unit) acts as a noise source. Second, it is possible to minimize a problem that the noise source due to the first reason affects the touch sensor resulting in a touch insensitivity phenomenon (normal sensing failure). Third, it is possible to minimize a problem of increasing inaccuracy of the touch sensor (touch error, touch malfunction, etc.) due to the second reason.

Meanwhile, although the noise avoidance period NAV present in the period of transition from the data input period DIN to the touch sensing period TSE is included in the touch sensing period TSE, the noise avoidance period NAV corresponds to a transition period prior to the actual touch sensing operation. However, since the noise avoidance period NAV is also included in the touch sensing period TSE, it may be referred to as an initial touch sensing period.

FIGS. 21 to 24 are diagrams showing a configuration of an output circuit, a configuration of a sub-pixel, and operations thereof according to a second embodiment in more detail.

Figure 21:
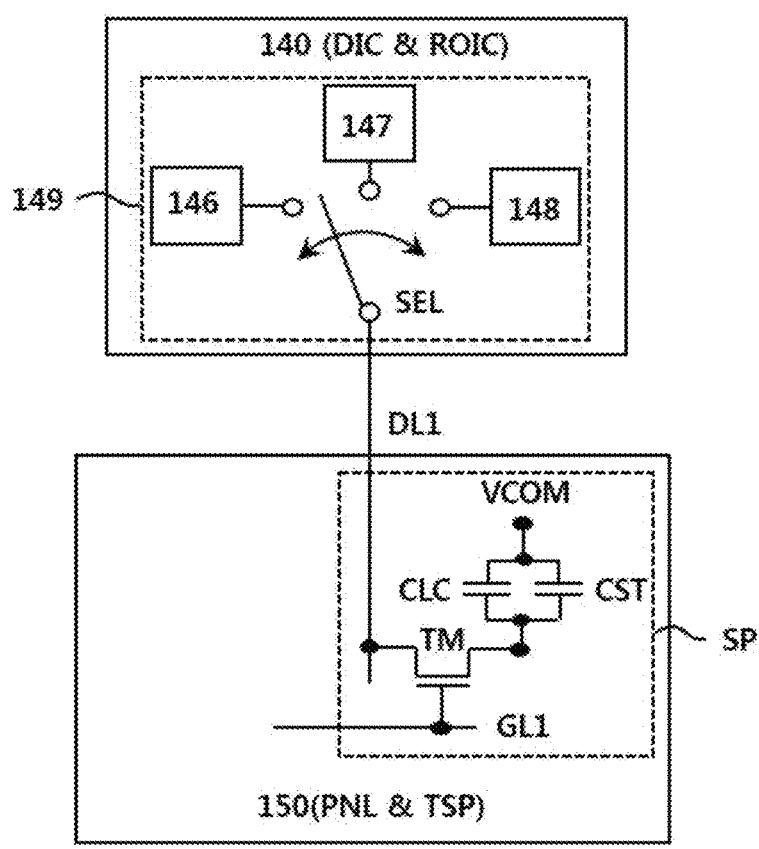
FIGS. 21 to 24 are diagrams showing a configuration of an output circuit, a configuration of a sub-pixel, and operations of the output circuit and the sub-pixel according to a second embodiment in more detail.

As shown in FIG. 21, the output circuit 149 according to the second embodiment may include the first output circuit 146, the second output circuit 148, the third output circuit 147, and the selector SEL as in the first embodiment. Further, the first output circuit 146, the second output circuit 148, the third output circuit 147, and the selector SEL may be the same as those of the first embodiment.

According to the second embodiment, the display panel 150 may be implemented as a liquid crystal display panel. A sub-pixel SP constituting the liquid crystal display panel may include a thin film transistor TM, a capacitor CST, and a liquid crystal CLC.

The thin film transistor TM may have a gate electrode connected to the first gate line GL1, a first electrode connected to the first data line DL1, and a second electrode connected to the capacitor CST and the liquid crystal CLC. The capacitor CST may have a first electrode connected to the second electrode of the thin film transistor TM and a second electrode connected to a common voltage line VCOM.

Figure 22:
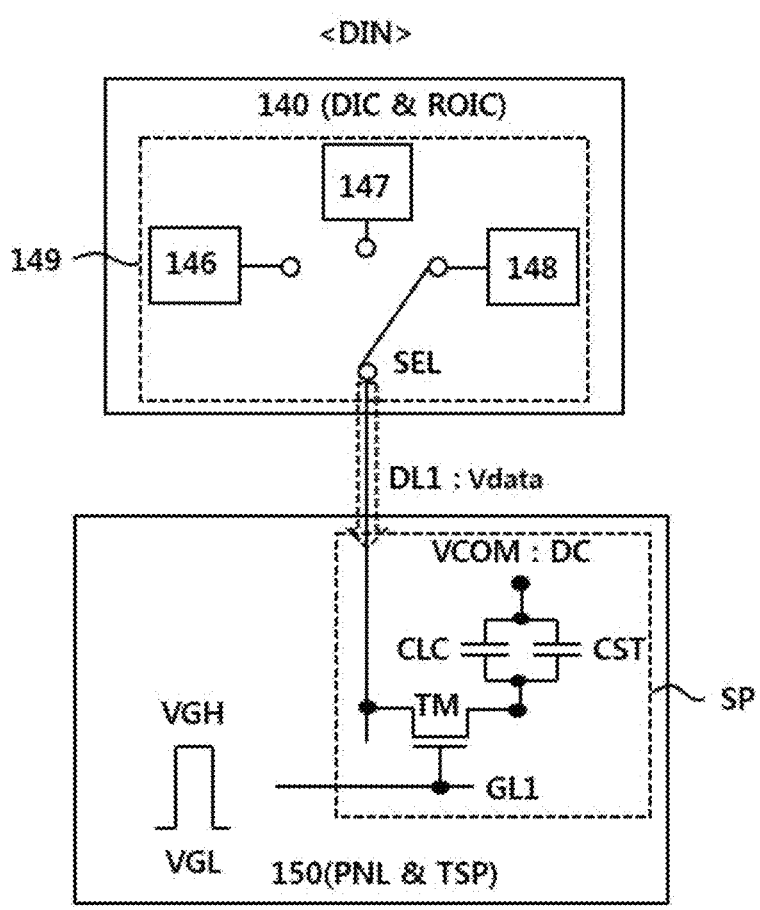

As shown in FIG. 22, the selector SEL may select the second output circuit 148 during the data input period DIN such that a data voltage Vdata is input through the first data line DL1. At this time, the sub-pixel SP may operate as follows. A gate signal composed of a gate high voltage VGH and a gate low voltage VGL may be applied to the first gate line GL1, the data voltage Vdata may be applied to the first data line DL1, and a DC common voltage may be applied to the common voltage line VCOM.

In this case, the sub-pixel SP may output light provided from the backlight unit in response to operations of the thin film transistor TM and the liquid crystal CLC controlled on the basis of the data voltage and the common voltage. As a result, the display panel 150 can display an image on the basis of the sub-pixel SP operating as described above.

Figure 23:
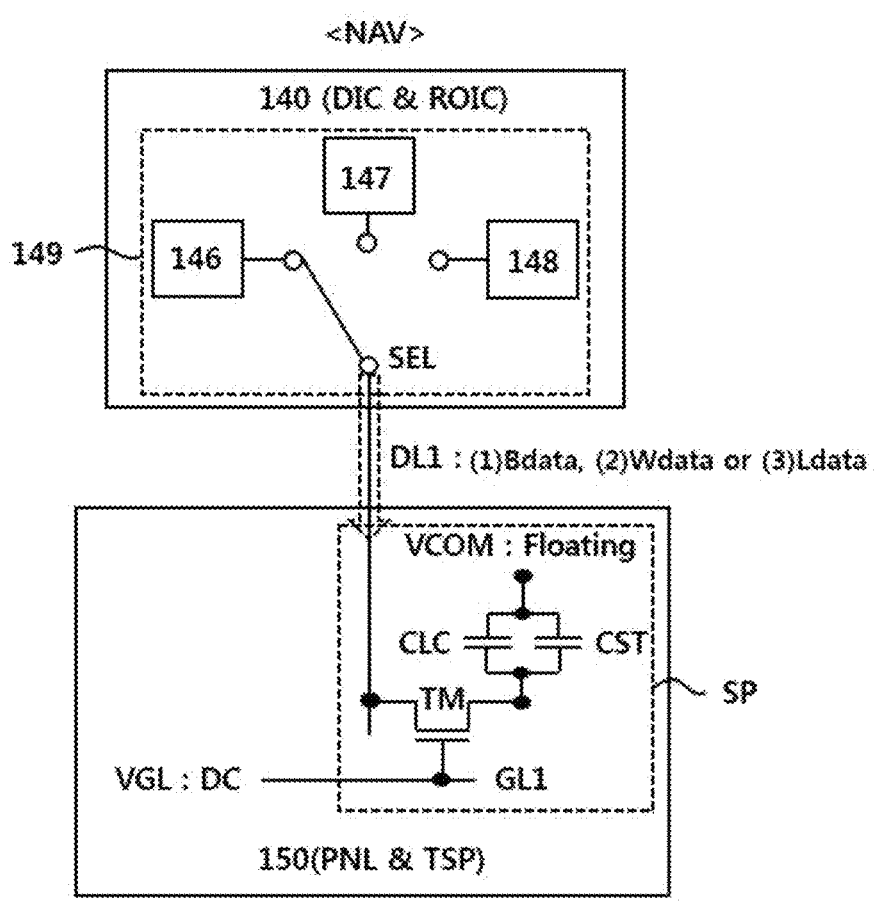

As shown in FIG. 23, the selector SEL may select the first output circuit 146 during the noise avoidance period NAV such that the black data voltage Bdata, the white data voltage Wdata, or the last data voltage Ldata is input through the first data line DL1. At this time, the sub-pixel SP may operate as follows. A gate signal composed of a DC gate low voltage VGL may be applied to the first gate line GL1, and a voltage (Bdata, Wdata, or Ldata) set in a specific form may be applied to the first data line DL1, and the common voltage line VCOM may be in a floating state.

In this case, the sub-pixel SP may be charged with the voltage (Bdata, Wdata, or Ldata) set in a specific form. As a result, it is possible to minimize the problem that the data lines DL1 to DLn are charged with undesirable voltages or become unstable, thus causing a touch insensitivity phenomenon (normal sensing failure) in the display panel 150.

Figure 24:
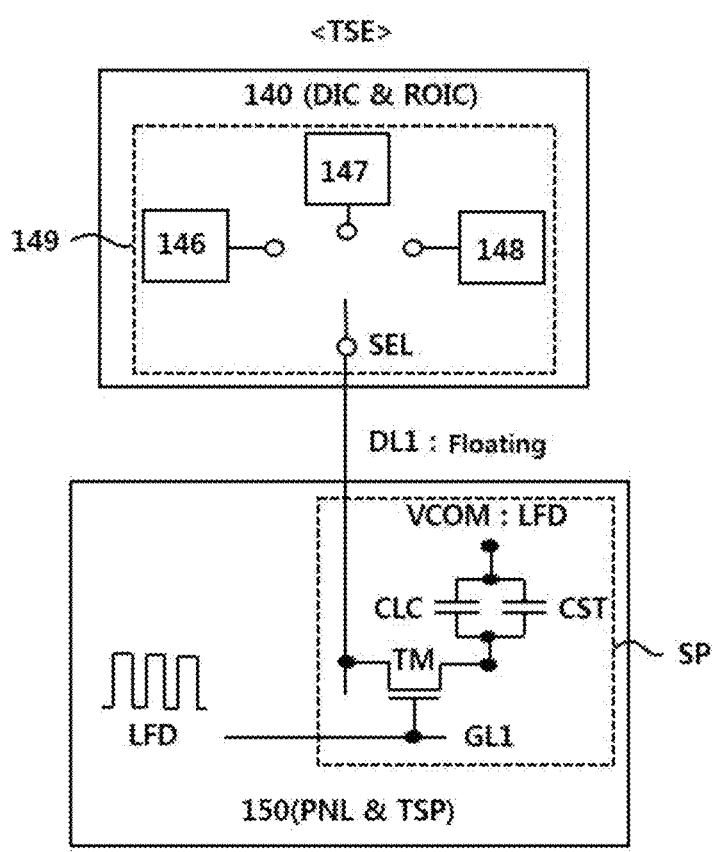

As shown in FIG. 24, the selector SEL may not select any output circuit such that the first data line DL1 is maintained in an electrically floating state during the touch sensing period TSE. That is, during the touch sensing period TSE, no voltage may be applied such that the voltage input in the noise avoidance period NAV is maintained or discharged. At this time, the sub-pixel SP may operate as follows. The load free signal LFD may be applied to the first gate line GL1, the first data line DL1 may be in a floating state, and the load free signal LFD may be applied to the common voltage line VCOM.

Since the display panel 150 can also be charged with a specific voltage (Bdata, Wdata, or Ldata) during the noise avoidance period NAV in the second embodiment, the second embodiment can have the same advantages as the first embodiment.

As described above, the present disclosure has an effect of minimizing a problem of a touch insensitivity phenomenon (normal sensing failure) caused by external light (sunlight, lighting, etc.) or internal light (e.g., in case where a backlight unit is included in a display panel) acting as a noise source. Further, the present disclosure has an effect of minimizing a problem of increasing inaccuracy of the touch sensor (touch error, touch malfunction, etc.). In addition, the present disclosure has an effect of minimizing a problem that the data lines of the display panel are charged with undesirable voltages or become unstable as external light (sunlight, lighting, etc.) or internal light (e.g., in case where a backlight unit is included in the display panel) acts as a noise source.

It will be apparent to those skilled in the art that various modifications and variations can be made in the present disclosure without departing from the spirit or scope of the disclosure. Thus, it is intended that the present disclosure cover the modifications and variations of this disclosure, which are included within the scope of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device having a touch sensor, comprising:
a display panel including a touch sensor configured to display an image and sense presence or absence of a touch;
a driver configured to time-division drive the display panel and the touch sensor; and
a controller configured to control the driver,
wherein in operation the driver outputs a set voltage during a transition period between a display period in which an image is displayed on the display panel and a touch sensing period in which the touch sensor senses, the set voltage being a last data voltage output from the driver for displaying the image based on the last data voltage before the transition period,
wherein the driver includes:
a first output circuit configured to output a data voltage;
a second output circuit configured to output the set voltage;
a third output circuit configured to output a load free signal; and
a selector configured to selectively connect one of the first output circuit, the second output circuit, and the third output circuit to a data line of the display panel, and
wherein the last data voltage is a voltage that maintains a previous image.

2. The display device of claim 1, wherein the set voltage is applied through a data line of the display panel.

3. The display device of claim 1, wherein the display panel includes a sub-pixel having a thin film transistor and a liquid crystal, and
wherein in operation, during the transition period, a DC gate low voltage is applied to a gate line of the sub-pixel, the set voltage is applied to the data line of the sub-pixel, and a common voltage line of the sub-pixel is electrically floating.

4. The display device of claim 3, wherein in operation, during the touch sensing period, a load free signal is applied to the gate line and the common voltage line of the sub-pixel, and the data line is electrically floating.

5. A display device having a touch sensor, comprising:
a display panel including a pixel configured to display an image and a touch sensor configured to sense a touch;
a data line coupled to the pixel; and
a driver coupled to a data line,
wherein the driver includes:
a first output circuit configured to output a data voltage to the data line;
a second output circuit configured to output a set voltage to the data line in a transition period between a display period and a touch sensing period;
a third output circuit configured to output a load free signal; and
a selector configured to selectively couple one of the first output circuit or the second output circuit to the data line or to decouple both of the first output circuit and the second output from the data line, wherein both the first output circuit and the second output circuit are configured to be decoupled from the data line for the touch sensing period, wherein the set voltage includes a last data voltage output from the first output circuit for displaying the image based on the last data voltage before the transition period, and wherein the last data voltage is a voltage that maintains a previous image.

6. The display device of claim 5, wherein the second output circuit is configured to be coupled to the data line immediately before the touch sensing period.

7. The display device of claim 5, wherein the second output circuit is configured to be coupled to the data line immediately after the touch sensing period.

8. The display device of claim 5, wherein the pixel includes a thin film transistor, and wherein in the touching sensing period, the third output circuit is configured to be coupled to a gate line of the pixel.

9. The display device of claim 5, wherein in operation, during the touch sensing period, the data line is electrically floating.

* * * * *